United States Patent [19]

Hashimoto et al.

[11] Patent Number: 4,689,686
[45] Date of Patent: Aug. 25, 1987

[54] IMAGE PICKUP APPARATUS

[75] Inventors: Seiji Hashimoto, Yokohama; Tadashi Okino, Tokyo, both of Japan

[73] Assignee: Canon Kabushiki Kaisha, Tokyo, Japan

[21] Appl. No.: 907,134

[22] Filed: Sep. 12, 1986

Related U.S. Application Data

[63] Continuation of Ser. No. 841,049, Mar. 17, 1986, abandoned, which is a continuation of Ser. No. 635,233, Jul. 27, 1984, abandoned.

[30] Foreign Application Priority Data

Aug. 2, 1983 [JP] Japan .................... 58-142153

[51] Int. Cl.$^4$ .................................... H04N 3/14
[52] U.S. Cl. .................... 358/213.26; 358/213.19
[58] Field of Search ............... 358/41, 140, 180, 209, 358/212, 213, 216, 224, 227, 228; 357/24 LR; 250/578

[56] References Cited

U.S. PATENT DOCUMENTS 3,497,614  2/1970  Petrocelli et al. .............. 358/180
4,002,824  1/1977  Petrocelli et al. .............. 358/213

Primary Examiner—Gene Z. Rubinson
Assistant Examiner—Stephen Brinich
Attorney, Agent, or Firm—Fitzpatrick, Cella, Harper & Scinto

[57] ABSTRACT

An image pickup apparatus for use in, for example, a camera, comprising: a solid-state image pickup device such as the CCD type or frame transfer type for converting an optical image to an electric signal; a readout unit for reading out the electric signal formed in the image pickup device at the speed corresponding to the scanning speed of the standard television system; and a readout controller for setting the readout speed in the vertical direction by the readout unit to be higher than the vertical scanning speed of the standard television system with respect to at least a partial interval in the vertical scanning interval. A quantity of image which is formed in the image pickup means is controlled by an iris or shutter or the like by use of the image signal which was read out by the readout controller at a high speed. With this apparatus, object data regarding photo metering or distance metering or the like can be obtained at a high speed, so that the discriminating operation for the photo metering or distance metering or the like and the control operation can be performed at a high speed.

35 Claims, 12 Drawing Figures

IMAGE PICKUP APPARATUS

This application is a continuation of application Ser. No. 841,049, filed Mar. 17, 1986, now abandoned, which is a continuation of Ser. No. 635,233, filed July 27, 1984, now abandoned.

BACKGROUND OF THE INVENTION

1. Field of the Invention

The present invention relates to an image pickup apparatus which is suitable to obtain exposure information and focus adjustment information.

2. Description of the Prior Art

Conventionally, in this kind of apparatus, image pickup means such as an image pickup tube, semiconductor image pickup device and the like is scanned and driven synchronously with the standard television system and by integrating an output of at least a part of such image pickup means, photometric information is obtained or by detecting the state (for example, contrast state) of a part of the above-mentioned periodic scanning output, the information with respect to the focus adjustment state is obtained.

Such an apparatus has a drawback such that the above-mentioned photometric or distance metering information cannot be derived unless the field interval has one television field interval at shortest.

Such a drawback is not a large problem in ordinary video cameras and the like.

Namely, for example, when considering an iris as a system which is controlled, an auto iris for servo-controlling the iris in response to an output of the image pickup means is known in the conventional video camera. However, in the case where this auto iris is always closed-loop controlled, a servo error signal is small excluding an object which has a particularly remarkable change in brightness, so that it takes only a short time to effect control. Therefore, the drawback mentioned above will not become a large problem.

However, in the case where only one picture image is picked up by such an image pickup apparatus, this drawback becomes a large problem. Namely, to pick up only one picture image, the apparatus has to be constituted so as to turn the power supply immediately before use of the apparatus for the purpose of saving the power source.

In this constitution, however, it takes the time period corresponding to a few fields until the servo becomes stable at an object value since the above-mentioned servo loop has not been functioning prior thereto.

On the other hand, the amount of feedback cannot be set to a small value in consideration of the response speed of the system which is controlled, such as an auto iris and the like, and of the stability of the servo.

Also, when considering the point of accuracy of, e.g., AE (Auto Exposure), the dynamic rage of the image pickup apparatus, particularly, of the semiconductor image pickup device is much more narrow than that of the conventional silver halide camera, so that a higher degree of exposure accuracy is required.

Further, in case of silver halide films, it is possible to fairly correct a slight exposure error at the processing laboratory if there is such an error. However, in the case of the image pickup apparatus, it has to be avoided and the receiver side is adjusted whenever an exposure error is caused.

Thus, the failure of AE is not contrarily permitted.

In this way, in the image pickup apparatus to pick up one picture image, the AE and AF (Auto Focus) controls with excellent leading characteristics and high accuracy are needed. On the contrary, for example, another method is also considered whereby an AE control signal is quickly obtained by increasing the driving frequency of the clock generator to drive the image pickup device by several times.

However, this method has the drawback that since the horizontal transferring frequency of the image pickup device is remarkably high, the horizontal transfer itself can be hardly performed and the electric power consumption also increases in proportion to an increase in frequency.

SUMMARY OF THE INVENTION

It is an object of the present invention to provide an image pickup apparatus which can solve such drawbacks in the conventional technology.

Another object of the invention is to provide an image pickup apparatus which can obtain object information in a short time with low electric power consumption.

Still another object of the invention is to provide an image pickup apparatus which can effect control with excellent leading characteristics.

DETAILED DESCRIPTION OF THE PREFERRED EMBODIMENTS

The present invention will now be described hereinbelow with respect to an embodiment thereof.

Figure 1:
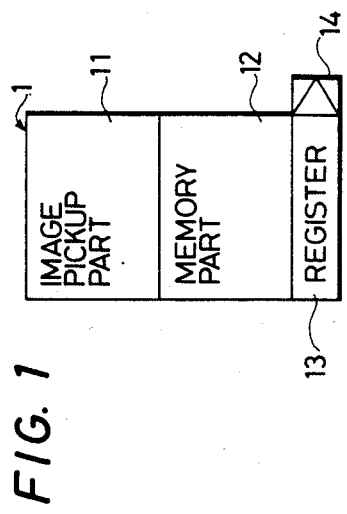
FIG. 1 is a diagram showing an example of an image pickup device which is suitable for use in the present invention.

FIG. 1 is a diagram showing a constitution of an image pickup device such as a CCD or the like of the frame transfer type to explain an embdiment of the present invention. An image pickup device 1 as image pickup means comprises: an image pickup part 11 serving as the photoelectric converting part; a memory part 12 to temporarily store the charges from the image pickup part; a horizontal shift register part 13 which horizontally transfers the charges after vertically transferring the charges from the memory part for every one horizontal scanning line (hereinbelow, referred as 1H), thereby reading out the charges; and an output amplifier 14 to amplify the charges from the horizontal register.

Figure 2:
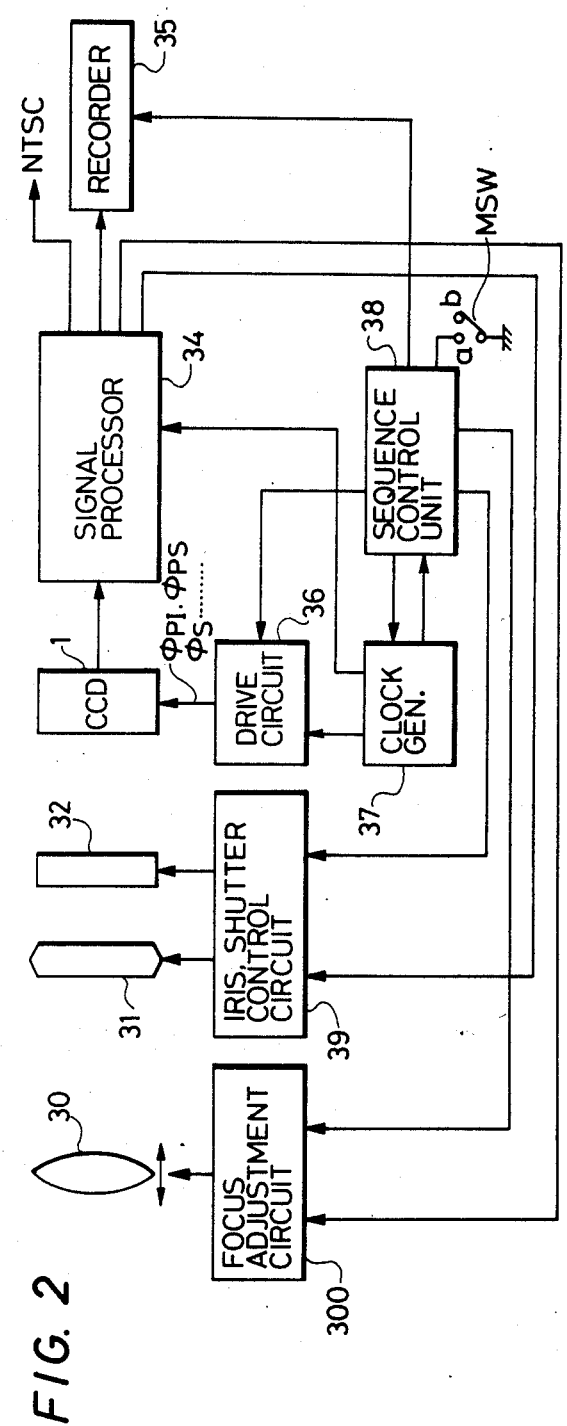
FIG. 2 is a block diagram showing an example of an arrangement of an image pickup apparatus of the present invention.

FIG. 2 is a diagram showing an example of an arrangement of an image pickup apparatus of the present invention. In the diagram, a reference numeral 30 denotes an image pickup lens as image forming means; 31 is an iris; 32 a shutter; 1 indicates, for instance, the CCD as the image pickup means; and 34 is a signal processor which processes an output of the CCD 1, thereby forming, e.g., an NTSC signal as standard television signal and supplying a video signal to a recorder 35. A drive circuit 36 serving as a readout means drives the CCD 1 so that it is horizontally and vertically scanned synchronously with the standard television signal. A clock generator 37 supplies this drive clock signal. A sequence control unit 38 serving as readout control means controls the start and stop of driving of the CCD; controls the recording operation of the recorder 35; controls the operation of an iris/shutter control circuit 39; and switches the readout mode by the drive circuit 36. An exposure control mode selecting switch MSW has a first mode in which it is connected to side a and a second mode in which it is connected to side b. The iris/shutter control circuit 39 serving as image quantity control means and exposure control means controls the driving of the iris 31 and shutter 32 in response to outputs of the sequence control unit 38.

Figure 3:
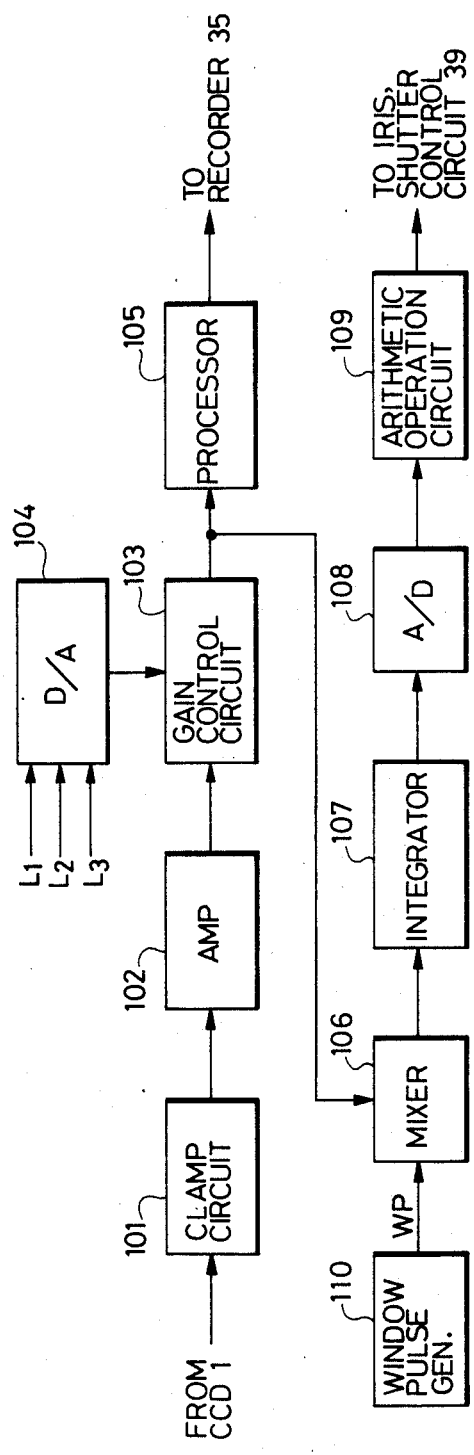
FIG. 3 is a diagram showing an arrangement of an AE control signal generating part.

In addition, such an AE control signal generating part as shown in FIG. 3 is included in the signal processor 34. This AE signal generating part is constituted so that it can limit the region which is used for photo metering. Also, a focus adjustment circuit 300 serving as means for controlling the image formation state allows the lens 30 to be deformed in the direction of an optical axis in response to an output of the signal processore 34, thereby adjusting the focus.

In FIG. 3, a numeral 103 denotes a gain control circuit; 104 is a D/A converter; 106 a mixer; 107 an integrator; and 108 an A/D converter. After the signal from the CCD 1 is reproduced as the DC signal by a clamp circuit 101, it is amplified by an amplifier 102 and is supplied to the gain control circuit 103 at the next stage. Although the amplification degree of the gain control circuit 103 is controlled by the D/A converter 104, it is ordinarily set to a standard amplification degree. When an object has low illuminance and the iris is opened, the amplification degree is increased so that the output signal level becomes a proper value. An output of the gain control circuit 103 is supplied to the recorder 35 through a processor 105 for performing the video signal processing and also to a photometric arithmetic operation system.

The mixer 106 of the photometric arithmetic operation system multiplies the signal obtained through the gain control circuit 103 by a pulse for the photometric part (hereinbelow, referred to as an window pulse) WP, thereby to obtain the video signal for photo metering from the portion corresponding to a photometric part 20 shown in FIG. 4.

Figure 4:
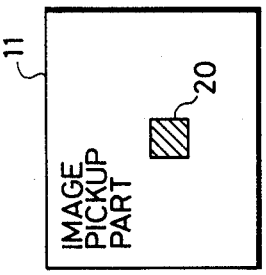
FIG. 4 is a diagram showing an example of the photo metering region.

A window pulse generator 110 generates a window pulse to specify a range of the photometric part 20 shown in FIG. 4. Thus, only a partial photometric signal is output from the mixer 106. The signal of the photometric part is integrated by the integrator 107 at the next stage and is converted to the DC signal. This DC signal is converted to the digital signal by the A/D converter 108, and the photometric state is evaluated by an arithmetic operation circuit 109 serving as discriminating means and arithmetic operating means at the next stage. The result of this estimation is supplied to the iris/shutter control circuit 39, thereby executing the feedback to the iris/shutter mechanism.

Figure 5:
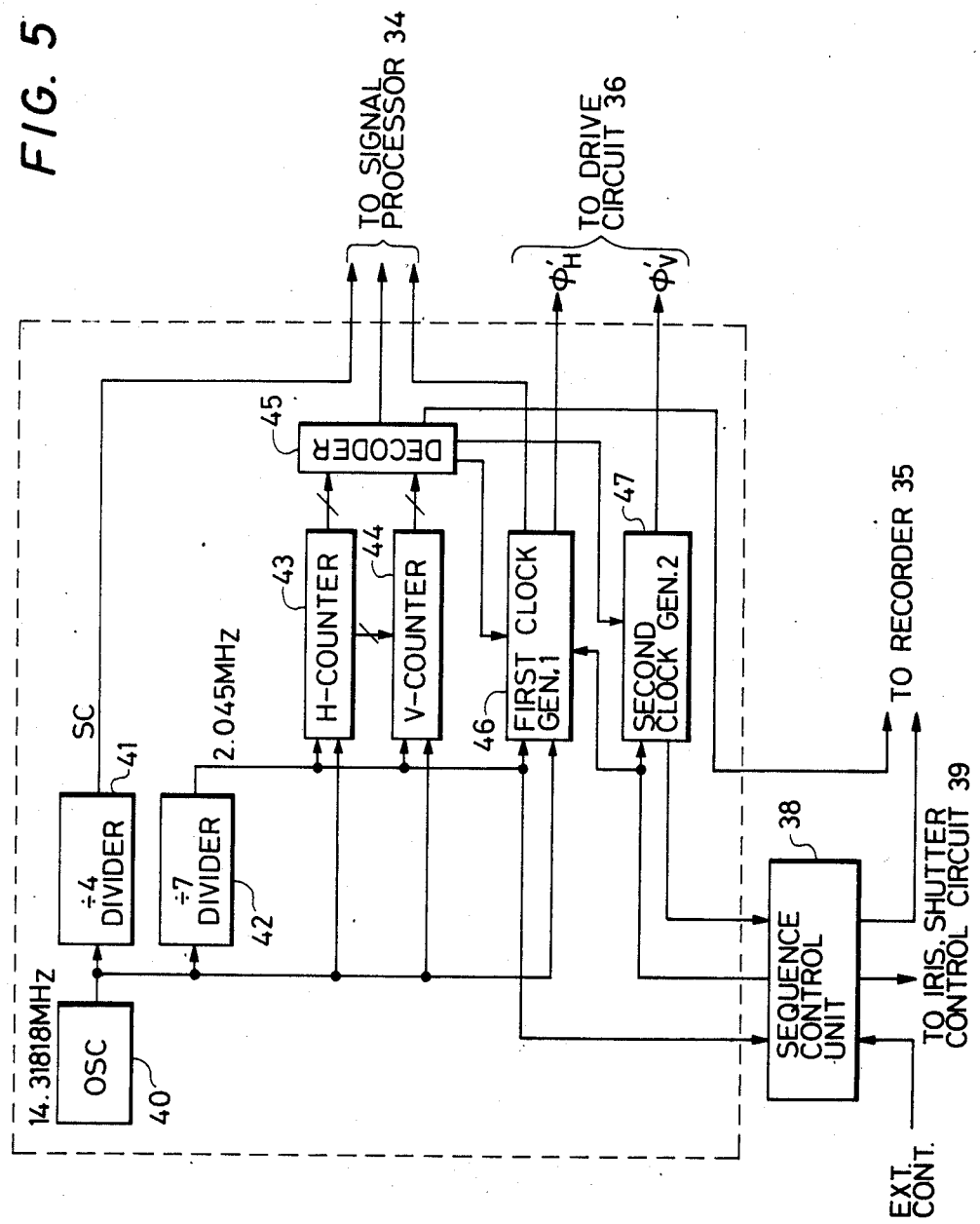
FIG. 5 is a diagram showing an example of an arrangement of a clock generator 37.

FIG. 5 is a diagram showing one example of the clock generator 37. A sync pulse generator 40 outputs a reference sync pulse of about 14 MHz. This sync pulse is frequency-divided into one-fourth by a ¼-divider 41 to form a subcarrier SC of about 3.58 MHz. The above-mentioned sync pulse is also frequency-divided into one-seventh by a 1/7-divider 42 to form a signal of about 2 MHz and this signal divided is supplied to an H-counter 43 and a V-counter 44. The H-counter 43 frequency-divides the signal of about 2 MHz into one-fifth and further divides into 1/13 and thereafter it divides into one-half.

Each output divided is combined by a logic gate and is decoded, thereby generating a pulse with regard to the horizontal synchronization. The V-counter 44 frequency-divides the pulse which was divided into 1/65 by the H-counter into 1/525 and this signal is decoded by an ROM, thereby generating a pulse with respect to the vertical synchronization.

A decoder 45 mixes the pulse regarding the horizontal synchronization and the pulse regarding the vertical synchronization to form a television sync signal. A first clock generator 46 outputs a pulse $\phi'_H$ relating to the horizontal driving from an output pulse of the decoder 45 and the clock pulses of 14 MHz and 2 MHz.

Also, a second clock generator 47 forms a vertical drive pulse $\phi_V$ from the output pulse of the decoder 45.

The storage timing, storage time, transfer timing, and readout timing of the solid-state image pickup device are controlled in accordance with the sequence of the sequence control unit 38. The first and second clock generators 46 and 47 are constituted so that their timings can be controlled by the sequence control unit 38. In addition, a control signal for the recorder 35 and control signals for the iris, shutter and the like are also output from the sequence control unit 38. The sequence control unit performs various controls using 2-MHz signal as a clock signal. The operations and functions of this sequence control unit are also controlled by external controls, for example, a power switch or release, shutter seconds, sensitivity switch, and the like upon photographing.

Figure 6:
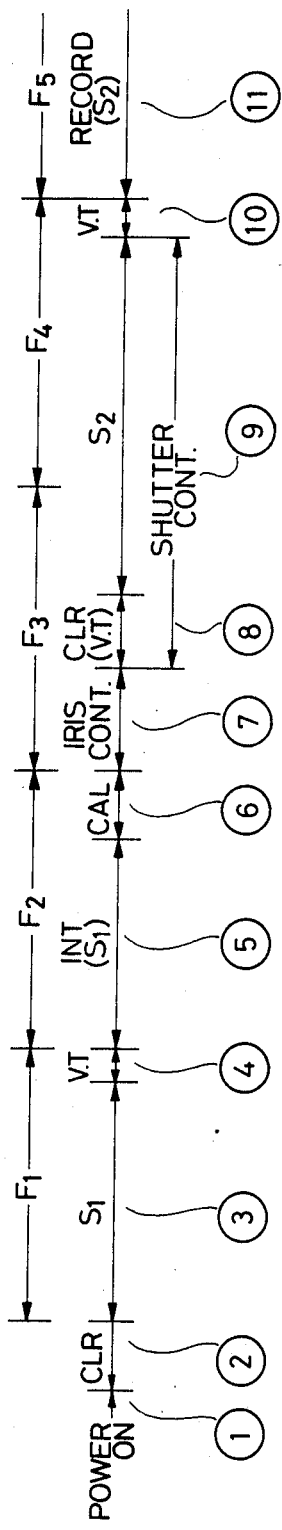
FIG. 6 is a diagram to explain an example of sequence and timing in the first exposure control mode.

Next, FIG. 6 is a diagram to explain the first exposure control mode of the present invention. When the mode selecting switch MSW is connected to the side a, a driving output pulse which will be mentioned later is output from the drive circuit 36 at a timing such as, for example, as shown in FIG. 6. $F_1$ to $F_{11}$ represent respective field intervals.

When the power supply (POWER) is turned on in the interval ①, the charges of the dark current component in the CCD are cleared (CLR) in the interval ② and the apparatus enters the photograph standby mode. The charges for photo metering are stored in a scanning interval $S_1$ of the $F_1$ field in the interval ③, and those charges are vertically transferred in a vertical blanking interval VT of the next interval ④ and are stored in the memory part. The charges are read out for every 1H in the interval ⑤ in the next $F_2$ field interval and are input to the mixer 106 through the clamp circuit 101, amplifier 102 and gain control circuit 103. Since the video signal is mixed to the window pulse corresponding to the photometric part by the mixer 106, only the signal corresponding to the photometric part is integrated by the next integrator 107.

Upon completion of the integration of the photometric part, this integration signal is A/D converted in the interval ⑥ and thereafter it is calculated by the arithmetic operation circuit 109, so that the optimum iris value is determined, thereby controlling the iris in the interval ⑦ on the basis of this value. The charges stored in the CCD during the photometric arithmetic operation are cleared as the unnecessary charges in the interval ⑧. Thereafter, the charges are stored in the interval ⑨ in accordance with the shutter seconds and then are vertically transferred in the vertical blanking interval of the $F_4$ field in the interval ⑩. Then, they are recorded on the recording medium in the $F_5$ field interval in the interval ⑪.

In this way, in the first exposure control mode of the image pickup apparatus of the present invention, the charges are stored and transferred for photo metering in accordance with the television synchronization.

Figure 7:
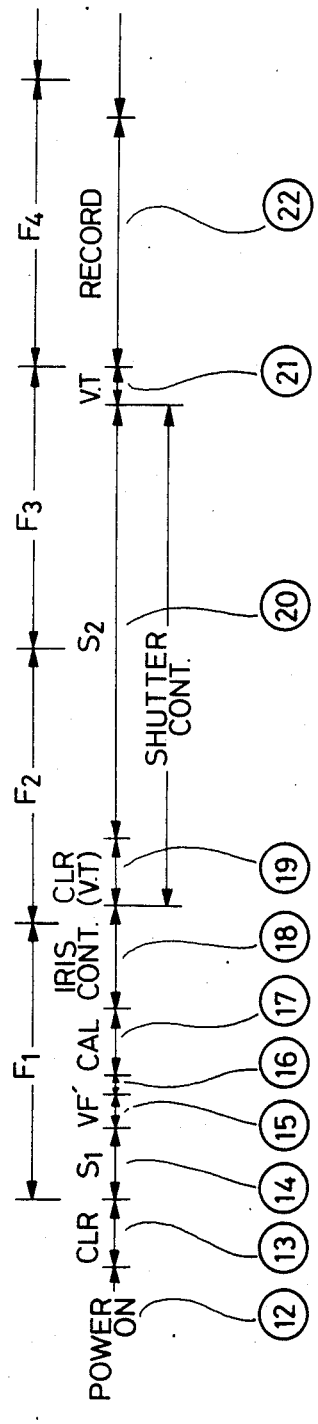
FIG. 7 is a diagram to explain an example of sequence and timing in the second exposure control mode.

FIG. 7 is a diagram showing the second exposure control mode. Different points from the first mode are that the charge storage for photo metering is performed not in one whole field interval but by use of a part of one field interval in order to shorten the photo metering time, and that since the charges of other parts than the photometric part have no relation to the photometric arithmetic operation, the charges at that time are transferred at a high speed and the charges of the photometric part are rapidly read out. When the POWER is turned on at the end of the interval ⑫ of the diagram in the state whereby the switch MSW is connected to the side b, the charges of the image pickup part 11 are read out at a high speed through the memory part 12 and horizontal register 13 and are cleared in the interval ⑬. Thereafter, the charges of the image pickup part are stored in only the interval ⑭ and those charges are vertically transferred to the memory part 12 in the interval ⑮. Then, they are read out through the horizontal shift register 13 in the interval ⑯ and are integrated. Thereafter, the result of this integration is calculated in the interval ⑰ and the iris control is performed in the vertical ⑱ on the basis of this calculation result. Subsequently, the charges of the image pickup part 11 are again cleared in the interval ⑲ and the shutter is opened, thereby allowing the exposure to be executed in only the interval ⑳. After that, the charges of the image pickup part are vertically transferred in the interval ㉑.

Figure 8:
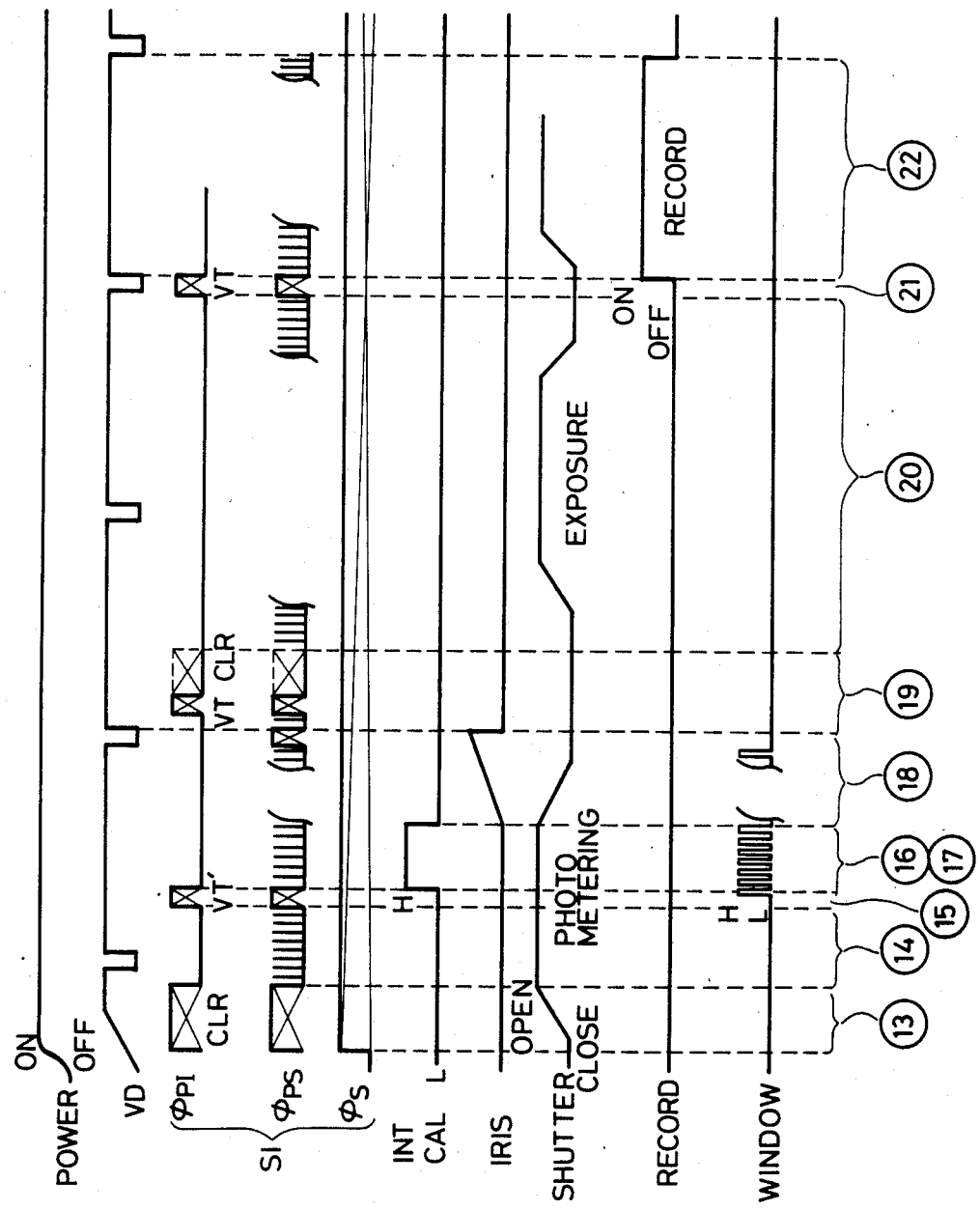
FIG. 8 is a diagram showing an example of the further detailed timing of FIG. 7.

Further, after that, the recording is done in the interval ㉒ in the $F_4$ field. FIG. 8 is a diagram showing an example of timing for the output pulse from the drive circuit 36 in case of the second exposure control mode shown in FIG. 7.

In FIG. 8, POWER denotes the power supply; VD is a TV vertical drive signal; and $S_1$ is a drive pulse group of the CCD. Also, $\phi_{PI}$ represents a charge storage and transfer pulse of the image pickup part; $\phi_{PS}$ is a charge transfer pulse of the memory part; $\phi_S$ a signal readout pulse of the horizontal shift register; INT an integration pulse; CAL a calculation pulse; IRIS an iris control signal; SHUTTER a shutter control signal; RECORD a recording control signal; and WINDOW a window pulse.

When the POWER is turned on, the unnecessary charges of the CCD are cleared by the pulse for clear (CLR) consisting of the pulse $\phi_{PI}$. The CCD then enters the photometric mode, so that the iris is set to a predetermined standard iris value and the shutter is opened. After an arbitrary photometric interval ⑭ passed, the charges in the vertical direction of the screen which is independent of the photo metering are removed in response to a vertical shift pulse VT' in the interval ⑮. At the same time, the charges of the photometric part reach the memory part immediately before the horizontal register. These charges corresponding to this photo metering are read out for every 1H in the intervals ⑯ and ⑰ in response to the drive pulse $\phi_{PS}$ of the memory part. After those charges were mixed to the window pulse, they are integrated and calculated. After the iris was controlled in the interval ⑱ on the basis of the calculation result, the photographing is performed and the recording is done in the interval ㉒. Although the iris and the like have been controlled on the basis of the photometric result of one time in this embodiment, in the case where a good calculation result is not obtained due to the improper condition of the initial iris setting, or in the case where the CCD is saturated, or when photo metering time is lacking, or the like, the photo metering, transfer, arithmetic operation, and iris and shutter controls may be performed until the optimum calculation result is derived. Generally, since the iris mechanism needs some time to control until the iris is set to a predetermined iris value, in order to calculate the optimum iris value, by controlling the shutter in place of the iris, the time necessary for the photo metering can be also further shortened.

Figure 9A:
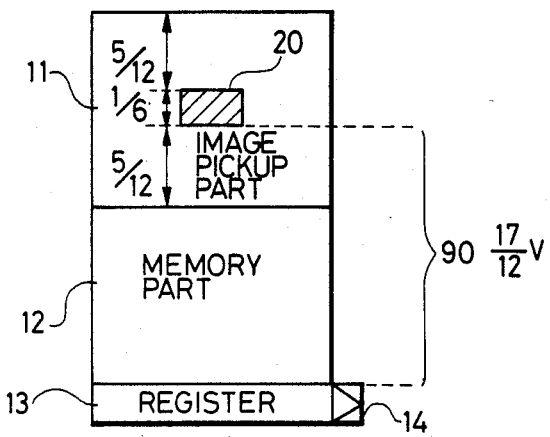
FIG. 9A is a diagram showing a practical example of the photometric part.
Figure 9B:
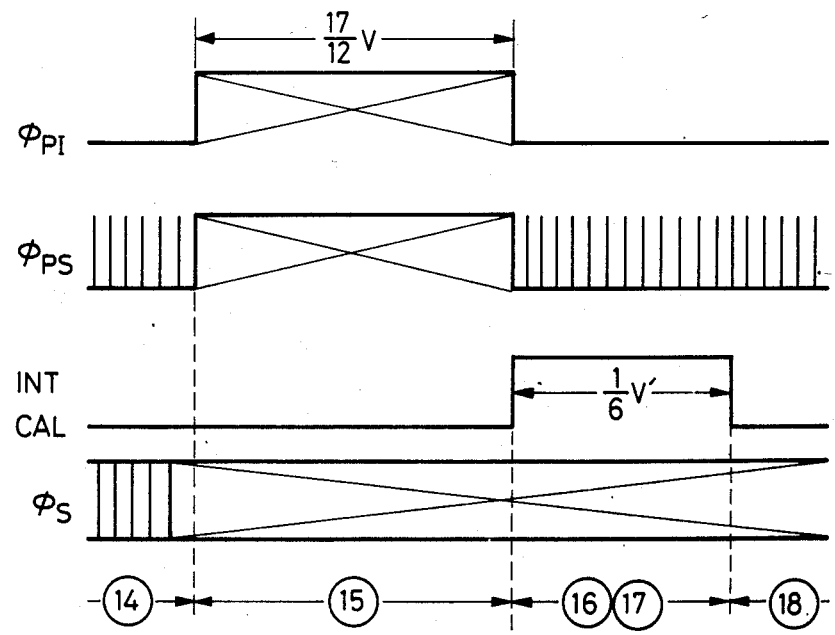
FIG. 9B is a diagram showing a first embodiment of a photometric timing pulse.
Figure 9C:
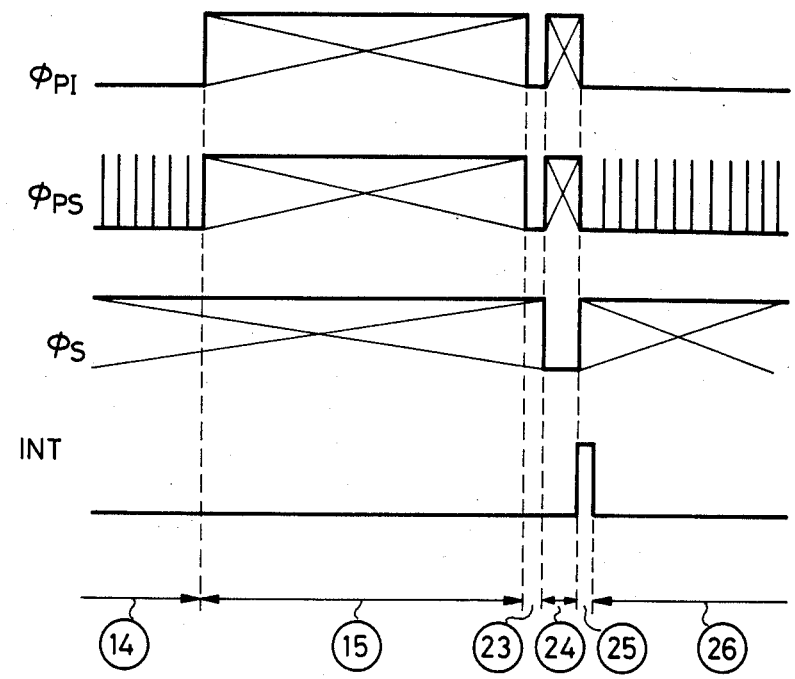
FIG. 9C is a diagram showing a second embodiment of a photometric timing pulse.

FIG. 9A is a diagram showing the region of the photometric part. FIGS. 9B and 9C are detailed diagrams showing timings for the charge vertical shift pulse for photo metering, namely, for the pulse in the intervals ⑮, ⑯ and ⑰ in FIG. 8.

FIG. 9A shows the case where the photometric part 20 has the width of 1/6 with respect to the vertical direction of the screen. Also, in this case, the frame transfer type CCD is used as the device. In FIG. 9B, when the storage interval ⑭ for photo metering is finished, the charges in the range indicated at 90 in the vertical direction of FIG. 9A are transferred to the horizontal shift register at a high speed in the interval ⑮ and are removed.

Since the number of pulses in the interval ⑮ corresponds to (17/12)·V (the number of scanning lines in the vertical direction), the number of pulses is approximately 347 (=245×(17/12)).

Next, in the intervals ⑯ and ⑰, the charges of the photometric part 20 of FIG. 9A are read out at the horizontal scanning speed at the standard television period. At this time, only the signal of a predetermined width in the horizontal scanning interval is gated in response to the window pulse. Further, this gated signal of the photometric part 20 is integrated and calculated. Thereafter, in the interval ⑱, the signal of the upper scanning lines of the photometric part 20 of FIG. 9A is read out in the time period necessary for the control of the iris and the like. Therefore, the fluctuation noise (or unevenness) due to the dark current can be prevented.

Next, FIG. 9C is a diagram showing another embodiment of the present invention. In this embodiment, instead of reading out the charges corresponding to the photmetric part for every 1H by the horizontal shift register, the charges of the photometric part are all added in the horizontal shift register and are averaged. In this case, the horizontal shift pulse $\phi_S$ is stopped in the interval ㉔. In addition, the integrator may perform the integration for only the interval of 1H in the interval ㉕ after that. Subsequently, in the interval ㉖, the sample and hold are carried out before the A/D conversion, then the A/D conversion is performed and the calculation is done.

Also, by supplying the pulses $\phi_{PS}$ and $\phi_S$ in this interval ㉖, the fluctuation noise (or unevenness) due to the dark current can be prevented.

On the other hand, in the timing charts shown in FIGS. 9B and 9C, the signal in the other parts than the photometric part 20, particularly, in the lower region in FIG. 9A in the photometric region is vertically transferred at a high speed and is cleared; therefore, the signal for photo metering and the like can be rapidly obtained, so that this contributes to easy control.

In particular, since the signal of the photometric part 20 is also added at a high speed and then is read out in the embodiment of FIG. 9C, the signal for photo metering and the like can be derived at further quick timing. In the case of the embodiment of FIG. 9C, an example has been shown whereby only a part of the screen is used as the photometric data. However, as well as only a part of the screen, the signal charges of one screen which were stored in a short time may be all added to the horizontal shift register.

Further, although the charges of a plurality of lines were added in the horizontal shift register in the embodiment of FIG. 9C, they may be added in the line near the horizontal shift register in the memory part 12.

Figure 10:
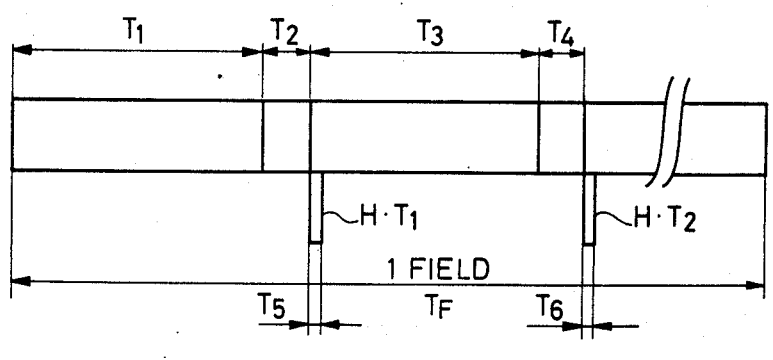
FIG. 10 is a diagram showing a third embodiment of a photometric timing.

Next, FIG. 10 is a diagram showing a third embodiment of the present invention. In this embodiment, photometric or distance metering data can be obtained by a plurality of times in one field interval $T_F$. In the diagram, $T_1$ and $T_3$ indicate storage times in the image pickup part 11, while $T_2$ and $T_4$ represent vertical transfer intervals and in these intervals, the horizontal shift pulse $\phi_S$ is not supplied to the horizontal shift register 13 of the CCD shown in FIG. 1.

Thus, the charges vertically transferred are added in this register.

On one hand, $T_5$ and $T_6$ are readout intervals of the horizontal shift register and respectively correspond to the scanning times of one line. In this way, by performing the control of driving by the drive circuit 36, the photometric or distance metering information can be obtained by a plurality of times in one field. Therefore, in the case where, for example, the exposure is controlled by use of the iris or the lens is driven on the basis of those respective information, the control of the controlled system can be completed in an extremely short time. In addition, even in the case where the condition of an object is changed, the invention has an effect such that it is possible to immediately cope with the change.

As described above, according to the present invention, in the image pickup apparatus which performs the readout operations in both vertical and horizontal directions in accordance with the standard television period, the readout speed in the vertical direction during the vertical scanning interval is set to a high speed for at least only a partial interval, so that object data regarding photo metering or distance metering or the like can be obtained at a high speed. Therefore, the discriminating operation for distance metering, photo metering or the like, and the control operation can be executed at a high speed.

We claim:

1. An image pickup apparatus comprising:
   image pickup means for converting an optical image to an electrical signal;
   readout means for reading out the electric signal formed by said image pickup means at a speed corresponding to the scanning speed of a standard television system;
   readout control means for controlling the readout speed in the vertical direction of said readout means to be faster than the vertical scanning speed of the standard television system with respect to at least a partial period in the vertical scanning period; and
   image quantity control means for controlling a quantity of image which is formed in said image pickup means by use of the electric signal read out by said readout means.

2. An apparatus according to claim 1, wherein said image pickup means includes a solid-state image pickup device.

3. An apparatus according to claim 2, wherein said image pickup means includes a solid-state image pickup device of the CCD type.

4. An apparatus according to claim 3, wherein said image pickup means includes a frame transfer type CCD.

5. An apparatus according to claim 1, wherein said image quantity control means includes exposure control means for controlling a quantity of incident light in said image pickup means.

6. An apparatus according to claim 5, wherein said exposure control means includes an iris to limit the incident light into said image pickup means.

7. An apparatus according to claim 5, wherein said exposure control means includes a shutter to control the time of light incidence into said image pickup means.

8. An image pickup apparatus comprising:
   image pickup means for converting an optical image to an electric signal;
   readout means for reading out the electric signal formed by said image pickup means at a speed corresponding to the scanning speed of a standard television system;
   readout control means for controlling the readout speed in the vertical direction by said readout means to be faster than the vertical scanning speed of the standard television system with respect to at least a partial period in the vertical scanning period; and
   image formation state control means for controlling the image formation state of the light incident on the image pickup means by use of the electric signal read out by said readout means.

9. An apparatus according to claim 8, wherein said image formation state control means controls the distance between said image pickup means and said image formation means.

10. An image pickup apparatus comprising:
    image pickup means for converting an optical image to an electric signal;
    readout means for reading out the electric signal formed by said image pickup means at a speed corresponding to the scanning speed of a standard television system;
    readout control means for controlling the readout speed in the vertical direction by said readout means to be faster than the vertical scanning speed of the standard television system with respect to at least a partial period in the vertical scanning period; and discriminating means for discriminating the brightness of an object by use of the electric signal read out by said readout means.

11. An image pickup apparatus comprising:
image pickup means for converting an optical image to an electric signal;
readout means for reading out the electric signal formed by said image pickup means at a speed corresponding to the scanning speed of a standard television system;
readout control means for setting the readout speed in the vertical direction of said readout means to be faster than the vertical scanning speed of the standard television system with respect to at least a partial period in the vertical scanning period; and
arithmetic operating means for operating at least a part of the electric signal read out from said image pickup means.

12. An apparatus according to claim 11, wherein said arithmetic operating means operates at least a part of the signal which was read out at a higher speed than the vertical scanning speed in the vertical scanning interval.

13. An apparatus according to claim 11, wherein said arithmetic operating means operates at least a part of the signal excluding the signal which was read out at a higher speed than the vertical scanning speed in the vertical scanning interval.

14. An image pickup apparatus comprising:
(a) image pickup means for converting an optical image to an electric signal;
(b) readout means for reading out the electric signal produced by said image pickup means at a speed corresponding to the scanning speed of a standard television system;
(c) readout control means for controlling the readout speed in the vertical direction of said readout means to be faster than the vertical scanning speed of the standard television system during at least a partial period in a vertical scanning period; and
(d) image condition control means for controlling a condition of the image in said image pickup means by using the image signal read out by said readout means.

15. An image pickup apparatus according to claim 14 wherein said image condition control means controls a quantity of the optical image as a condition of an image.

16. An image pickup apparatus according to claim 14, wherein said image condition control means controls a focusing condition of the optical image as a condition of an image.

17. An image pickup apparatus comprising:
image pickup means for converting an image into an electric signal; and
control means for controlling said image pickup means, said control means being capable of setting at least two control modes,
wherein in a first mode at least a part of the electric signal converted by said image pickup means is read out during a first period which is relatively short, and in a second mode such that the electric signal is read out during a second period which is relatively long.

18. An apparatus according to claim 17, wherein the second period corresponds to a period associated with a scanning speed in a standard television system.

19. An apparatus according to claim 17, further comprising record means for recording as an image signal, the electric signal read out in the second mode.

20. An apparatus according to claim 17, further comprising integrating means for integrating the electric signal read out in the first mode.

21. An apparatus according to claim 20, further comprising exposure control means for controlling an exposure condition of said image pickup means by using a signal integrated in said integrating means.

22. An apparatus according to claim 21, wherein said exposure control means includes a diaphragm.

23. An apparatus according to claim 17, wherein in the first mode said control means adds at least the part of the electric signal converted by said image pickup means, to read out the added signal.

24. An apparatus according to claim 20, further comprising:
gate means for performing a gate operation of a predetermined portion of the signal read out in the first mode,
wherein the signal supplied through said gate means is integrated by said integrating means.

25. An apparatus according to claim 17, further comprising focus control means for controlling an image focus condition of said image pickup means by using the signal read out in the first mode.

26. An apparatus according to claim 17, wherein the second period is long enough to include one television field period.

27. An image pickup apparatus comprising:
image pickup means for converting an image into an electric signal including a charge transfer device;
first control means for controlling said image pickup means, said first control means being capable of setting at least a control mode in which a part of the electric signal converted by said image pickup means is charge-transferred at a relatively high speed to be cleared and a remaining part of the electric signal is read out at a relatively low speed; and
second control means for controlling an image converting condition of said iamge pickup means by using the electric signal which is read out at the relatively low speed.

28. An apparatus according to claim 27, wherein said second control means controls a quantity of the signal converted by said image pickup means.

29. An apparatus according to claim 28, wherein said second control means controls an image exposure condition of said image pickup means.

30. An apparatus according to cLaim 29, wherein said second control means includes a diaphragm.

31. An apparatus according to claim 27, wherein said second control means controls an image focus condition of said image pickup means.

32. An apparatus according to claim 27, wherein said first control means is capable of setting a mode in which the signal converted by said image pickup means is read out during one television field period.

33. An apparatus according to claim 32, further comprising a recording device which records as an image signal the signal read out for one television field period.

34. An image pickup apparatus comprising:
(a) image pickup means for converting an optical image to an electric signal; and
(b) readout means for reading out the electric signal formed in said image pickup means at a speed corresponding to the scanning speed of a standard television system, and for changing the readout speed in the vertical direction of a predetermined field to be faster than the vertical scanning speed of the standard television system with respect to at least a partial period in the vertical scanning period;

wherein said readout means repeats the formation of the electric signal in said image pickup means and the readout of said electric signal a plurality of times in one field period.

35. An image pickup apparatus comprising:

(a) image pickup means for converting an optical image to an electric signal; and (b) readout means for horizontally and vertically scanning the electric signal formed in said image pickup means in accordance with a standard television system, and for changing the speed of said vertical scanning to be faster than the vertical scanning speed of the standard television system in a predetermined period in one field period;

wherein said readout means repeats the formation of the electric signal in said image pickup means and the readout of said image signal a plurality of times in one field period.

* * * * *

UNITED STATES PATENT AND TRADEMARK OFFICE
CERTIFICATE OF CORRECTION

PATENT NO. :    4,689,686    Page 1 of 2
DATED :    August 25, 1987
INVENTOR(S) :    Seiji Hashimoto, et al.

It is certified that error appears in the above-identified patent and that said Letters Patent is hereby corrected as shown below:

COLUMN 1

Line 36, "small" should read --small,--.
    Line 45, "turn" should read --turn on--.

COLUMN 2

Line 54, "timing" should read --timing pulse--.
    Line 62, "embdiment" should read --embodiment--.

COLUMN 3

Line 2, "referred" should read --referred to--.
    Lines 36-7, "processore" should read --processor--.
    Line 58, "an" should read --a--.

COLUMN 4

Line 15, "signal divided" should read
        --divided signal--.

COLUMN 5

Line 44, "vertical" should read --interval--.

UNITED STATES PATENT AND TRADEMARK OFFICE
CERTIFICATE OF CORRECTION

PATENT NO. : 4,689,686
DATED : August 25, 1987
INVENTOR(S) : Seiji Hashimoto, et al.

It is certified that error appears in the above-identified patent and that said Letters Patent is hereby corrected as shown below:

COLUMN 6

Line 64, "photmetric" should read --photometric--.

COLUMN 7

Line 24, "be all" should read --all be--.

COLUMN 10

Line 52, "cLaim 29," should read --claim 29,--.

COLUMN 11

Line 9, "the" should read --said--.

COLUMN 12

Line 11, "the" should read --said--.
    Line 12, "stored a" should read --signal is stored a--.

Signed and Sealed this

Fifteenth Day of March, 1988

Attest:

DONALD J. QUIGG

*Attesting Officer*     *Commissioner of Patents and Trademarks*